(12) United States Patent
Sato et al.

(10) Patent No.: US 6,306,027 B1
(45) Date of Patent: Oct. 23, 2001

(54) SALMON ROE SELECTING AND WASHING MACHINE

(75) Inventors: Atushi Sato; Masanori Yoshida, both of Kushiro (JP)

(73) Assignee: Nikko Co., Ltd., Hokkaido (JP)

( * ) Notice: Subject to any disclaimer, the term of this patent is extended or adjusted under 35 U.S.C. 154(b) by 0 days.

(21) Appl. No.: 09/569,133

(22) Filed: May 11, 2000

(30) Foreign Application Priority Data

Oct. 25, 1999 (JP) ................................................. 11-302248

(51) Int. Cl.$^7$ ................................................... A22C 21/06
(52) U.S. Cl. ........................... 452/110; 452/123; 452/173
(58) Field of Search .................................... 452/110, 173, 452/123, 7

(56) References Cited

U.S. PATENT DOCUMENTS

| | | | |
|---|---|---|---|
| 1,000,648 | * | 8/1911 | Wacker .................................. 452/110 |
| 2,104,450 | * | 1/1938 | Campbell .............................. 452/123 |
| 2,640,223 | * | 6/1953 | Secor .................................... 452/173 |
| 2,784,447 | * | 3/1957 | Thompson et al. .................. 452/110 |
| 2,808,615 | * | 10/1957 | Snow .................................... 452/173 |
| 3,846,869 | * | 11/1974 | Barbee ................................. 452/123 |
| 4,332,057 | * | 6/1982 | Smith .................................... 452/110 |

FOREIGN PATENT DOCUMENTS 1521-425-A * 11/1989 (SU) ..................................... 452/173

* cited by examiner

*Primary Examiner*—Willis Little
(74) *Attorney, Agent, or Firm*—Koda & Androlia

(57) ABSTRACT

The present invention relates to a salmon roe selecting and washing machine which can completely remove faulty roe and foreign substances from normal, mature roe, wherein the salmon roe selecting and washing machine has at least one salmon roe transferring plate 11 extending in the salmon roe transferring direction, in which a number of slits 14 having such a width that normal salmon roe does not fall down are formed, and resiliently supporting a salmon roe transferring portion 7 inclined downward in the salmon roe transferring direction at a frame 5 thereof, a vibrating means 16 is provided at the salmon roe transferring portion, and a shower means 18 for sprinkling salt water is secured above the salmon roe transferring portion 17. By sprinkling salt water by the shower means 18 while vibrating the salmon roe transferring portion 7 by the vibrating means, and transferring salmon roe by streams of salt water, faulty roe and foreign substances, etc., can be removed through the slits 14 of the salmon roe transferring plates 11, and only normal, mature roe can be collected at a regular position.

4 Claims, 3 Drawing Sheets

SALMON ROE SELECTING AND WASHING MACHINE

TECHNICAL FIELD OF THE INVENTION

The present invention relates to a salmon roe selecting and washing machine for washing salmon roe taken from the abdominal cavity of salmon while selecting the salmon roe.

BACKGROUND OF THE INVENTION

Generally, salmon roe taken from the abdominal cavity includes not only normal, mature roe but also faulty roe such as immature roe, damaged, defected or crushed roe, and foreign substances such as blood, blood clot, pieces of internal organs, scales, blood vessels, etc.

If such faulty roe and/or foreign substances are mixed with normal, mature roe, the commodity value of the mature roe is reduced. It is necessary that faulty roe and foreign substances be reduced from the normal, mature roe.

Therefore, since before, a drum type, etc., salmon roe washing machine which washes salmon roe has been publicly known.

However, since, in prior art salmon roe washing machine, it is impossible to separate immature roe from normal, mature roe and impossible to easily separate and remove foreign substances from the normal, mature roe, immature roe and foreign substances could not be completely separated and removed from normal, mature roe by only washing them by any one of the prior art salmon roe washing machines. If faulty roe is mixed in normal, mature roe, the contents containing oily substances of the faulty roe are adhered to the mature roe, the mature roe is discolored by the oily substances, whereby there was a fear that the commodity value of the normal, mature roe is reduced.

For this reason, conventionally, foreign substances are roughly separated and removed from mature roe by a salmon roe washing machine, and workers must visually check roe to remove faulty roe and foreign substances from normal, mature roe.

If faulty roe and foreign substances cannot be completely separated from mature roe by only the washing machine, manpower is required to separate and remove faulty roe and foreign substances as additional work, whereby working efficiency is reduced and also the price of salmon roe is accordingly increased.

On the other hand, since there has been no machine that can simultaneously select and wash salmon roe in the prior arts, a salmon roe washing machine and a salmon roe selecting machine are required in order to carry out both washing and separation of salmon roe at the same time, whereby since salmon roe must be inputted in both the machines, working efficiency is worsened.

SUMMARY AND OBJECT OF THE INVENTION

The present invention was developed in order to solve these and other problems, and it is therefore an object of the invention to provide a salmon roe selecting and washing machine which is capable of completely removing faulty roe and foreign substances from normal, mature roe, and simultaneously select and wash salmon roe.

In order to achieve the abovementioned object, according to a first aspect of the invention, a salmon roe selecting and washing machine having at least one salmon roe transferring plate extending in the salmon roe transferring direction, in which a number of slits having such a width that normal salmon roe do not fall through are formed, and resiliently supporting a salmon roe transferring portion inclined downward in the salmon roe transferring direction in a frame thereof, wherein a means for vibrating the salmon roe transferring portion is provided at the salmon roe transferring portion; and a shower means for sprinkling salt water onto the salmon roe transferring portion is secured above the salmon roe transferring portion. By the abovementioned construction, salmon roe is transferred by streams of salt water by sprinkling salt water, using a shower means while vibrating the salmon roe transferring portion by the vibrating means, faulty roe and foreign substances, etc., can be eliminated through slits of the salmon roe transferring plate, whereby only normal, mature roe can be collected at a predetermined position.

According to a second aspect of the invention, a salmon roe selecting and washing machine is featured in that a plurality of the salmon roe transferring plates are disposed in a salmon roe transferring direction, and clearance through which normal salmon roe will not fall is formed between adjacent pairs of salmon roe transferring plates. Since the salmon roe selecting and washing machine is thus constructed, it is possible to remove faulty roe and foreign substances through clearance between adjacent pairs of salmon roe transferring plates.

According to a third aspect of the invention, a salmon roe selecting and washing machine is featured in that a salmon roe supplying casing spring-pressed upward is disposed at the upstream end of said salmon roe transferring portion and a chute for supplying salmon roe is provided upward of said salmon roe supplying casing. Since such a construction is employed, vibration of the salmon roe transferring portion, which are produced by the vibrating means, can be received by the springs, and salmon roe from the chute can be supplied from the salmon roe supplying casing to the salmon roe transferring portion in a stable state.

According to a fourth aspect of the invention, a salmon roe selecting and washing machine is featured in the said vibrating means is provided at both sides of said salmon roe transferring portion. Since such a construction is employed, it is possible to vibrate the salmon roe transferring portion in a stable state.

According to a salmon roe selecting and washing machine of the invention, since it is possible to completely remove faulty roe and foreign substances from normal, mature roe, selection and washing of salmon roe can be efficiently carried out at the same time.

That is, the salmon roe selecting and washing machine according to the invention is provided with at least one salmon roe transferring plate on which a number of slits having such a width that normal, mature roe do not fall through, and extending in the salmon roe transferring direction, are formed, wherein a salmon roe transferring portion which is inclined downward in the salmon roe transferring direction is resiliently supported on the frame, a means for vibrating the salmon roe transferring portion is provided at the salmon roe transferring portion, and a means for sprinkling salt water onto the salmon roe transferring portion is disposed above the salmon roe transferring portion. Therefore, salmon roe is transferred by streams of salt water by sprinkling salt water while vibrating the salmon roe transferring portion by a vibrating means, and faulty roe and foreign substances, etc., can be removed through the slits of the salmon roe transferring plates, whereby only normal, mature salmon roe can be collected at a regular position.

Further, a plurality of salmon roe transferring plates are disposed along salmon roe transferring direction, and clearance by which normal, mature salmon roe cannot fall through is formed between the adjacent pairs of salmon transferring plates, whereby faulty roe and foreign substances can be removed through the clearance between and adjacent pairs of transferring plates.

Still further, a salmon supplying casing which is pressed upward by a coil spring is disposed at the upstream end of the salmon roe transferring portion, and a chute which can supply salmon roe is provided upward of the salmon roe supplying casing, whereby vibrations of the salmon roe transferring portion by a vibrating means can be received by the spring, and salmon roe coming from the chute can be smoothly supplied from the salmon roe supplying casing to the salmon roe transferring portion.

In addition, if the vibrating means is attached at both sides of the salmon roe transferring portion, it is possible to smoothly vibrate the salmon roe transferring portion.

PREFERRED EMBODIMENTS OF THE INVENTION

Figure 1:
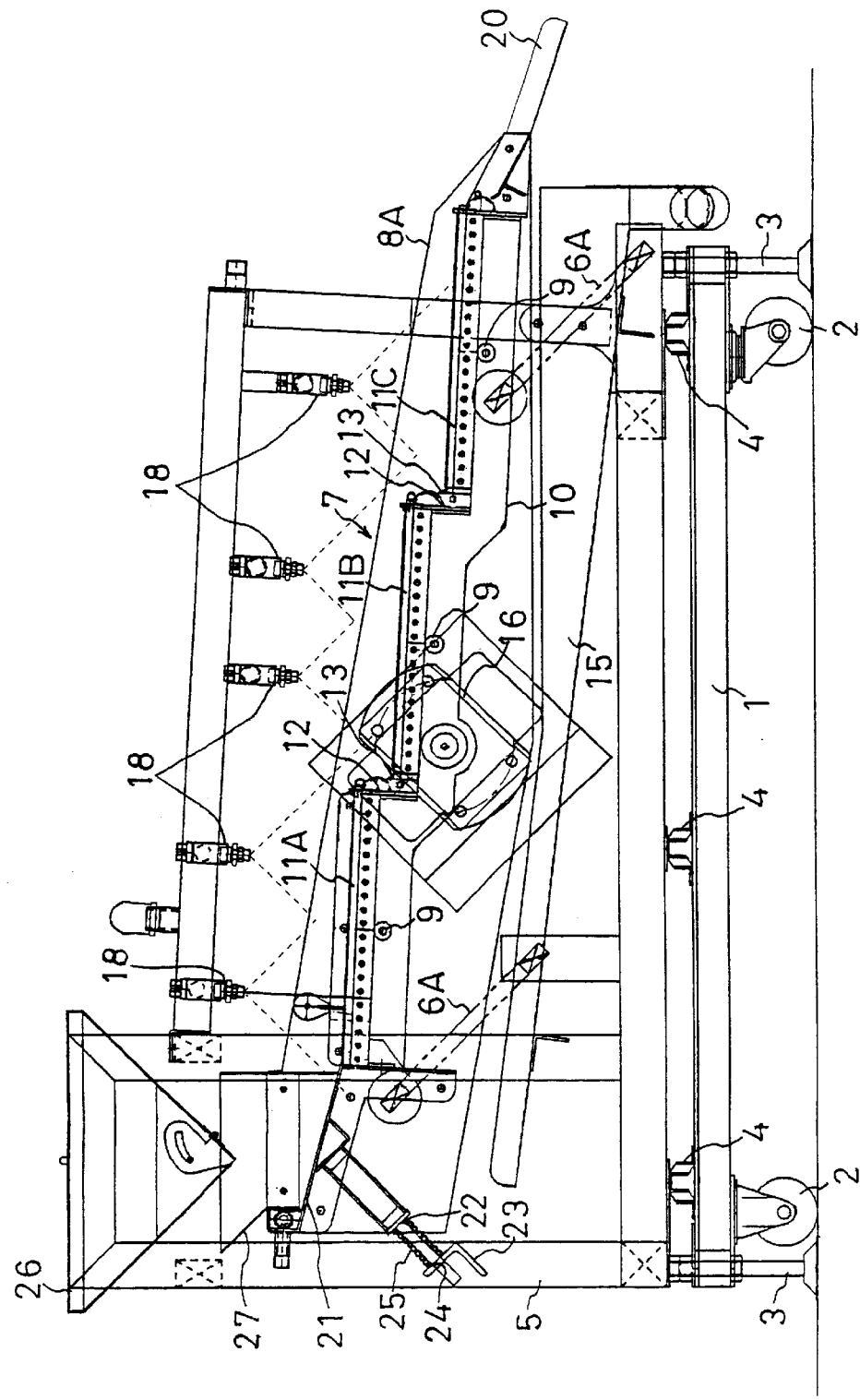
FIG. 1 is a front elevational view showing a preferred embodiment of a salmon roe selecting and washing machine according to the invention.
Figure 2:
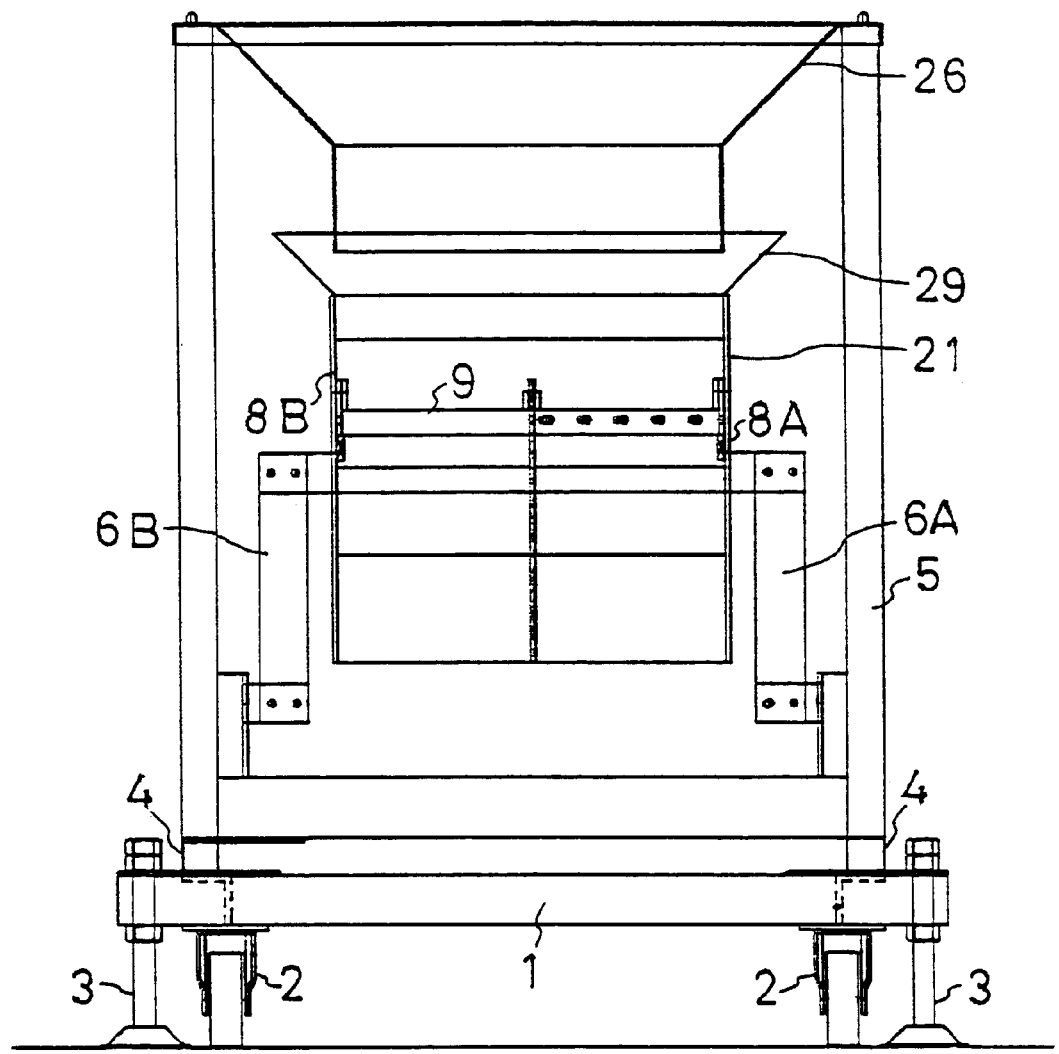
FIG. 2 is a left side elevational view of FIG. 1.
Figure 3:
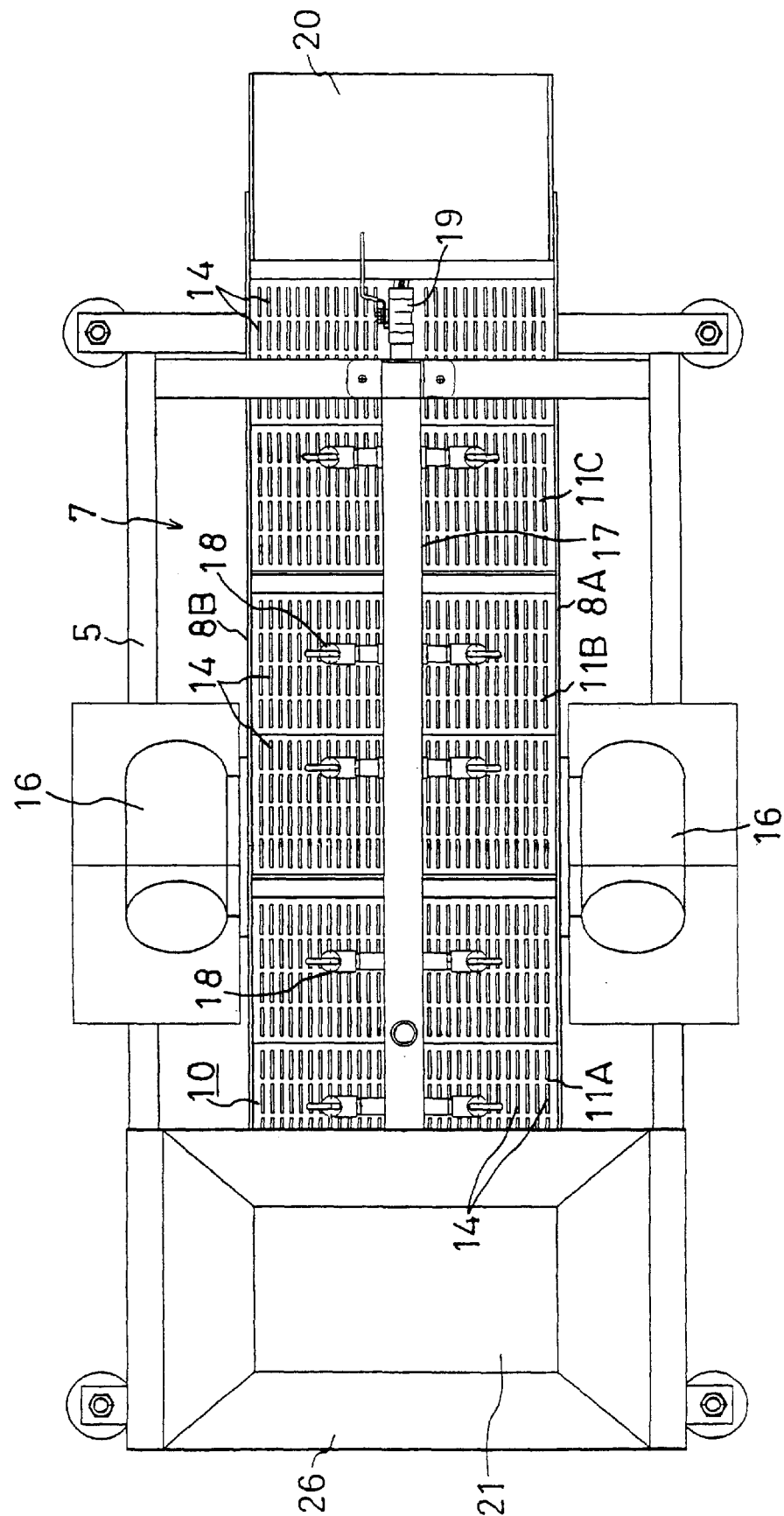
FIG. 3 is a plan view of FIG. 1.

FIG. 1 through FIG. 3 show a preferred embodiment of a salmon roe selecting and washing machine according to the invention. The salmon roe selecting and washing machine has an almost rectangular planar base 1 provided with a plurality of casters 2 thereunder. At each of the four corners of the planar base 1, a stopper 3 is supported so as to be vertically movable. Also, a frame 5 is supported on the planar base 1 via a plurality rubber shock absorbing members 4.

The respective base end portions of resilient arms 6A, 6A, 6B, and 6B consisting of four flexible materials which become the left and right direction in FIG. 1 and secure clearance in the lengthwise direction of the base 1, and which become the vertical direction of the paper of FIG. 1 and secure clearance in the width direction of the base 1 are supported on the frame 5. The respective two resilient arms 6A and 6B of the arms are disposed at the position mirror-symmetrical to each other in the width direction of the base 1.

A side plate 8A or side plate 8B of the salmon roe transferring portion 7 is supported at the upper end portion of the resilient arms 6A and 6A or resilient arms 6B and 6B, which are located at the respective side edges of the base 1. Both side plates 8A and 8B are disposed so as to become parallel to each other, and three supporting rods 9 are fixed between both side plates 8A and 8B with clearance secured in the lengthwise direction of the base 1.

Also, a transfer plate assembly 10 in which three salmon roe transferring plates 11A, 11B and 11C for transferring salmon roe along the upper side thereof are integrated together is fixed between both the side plates 8A and 8B. The respective salmon roe transferring plates 11 each placed on the supporting rod 9 is gently inclined along the salmon roe transfer direction, and a step 12 is formed between and adjacent pair of the salmon roe transferring plates 11A and 11B and between salmon roe transferring plates 11B and 11C so that the plates located at the upstream side are positioned upward of those located at the downstream side.

Further, clearance 13 is formed between an adjacent pair of the salmon roe transferring plates 11A and 11B and between salmon roe transferring plates 11B and 11C. The dimension of the clearance 13 is described later.

As shown in FIG. 3, a number of slits 14 of the same shape, extending in the salmon roe transferring direction, are formed on the respective salmon roe transferring plates 11 in the lateral and longitudinal directions with some clearance remaining. The width dimension of these slits 14 is formed so that normal, mature roe cannot drop therethrough, but faulty roe such as immature roe, defected roe, crushed roe, and foreign substances such as blood, blood clot, pieces of internal organs, scales, blood vessels, etc., can drop through. Therefore, when salmon roe is transferred on the respective salmon roe transferring plates 11, faulty roe and foreign substances will drop down through the respective slits 14. Also, the dimension of the clearance 13 is formed as in the width dimension of the slits 14.

However, since the degree of mature of salmon roe differs according to the season of maturity, several types of transferring plates assemblies 10 are prepared, in which a number of slits 14 of the same width having a width dimension (for example, 1 mm, 2 mm, 3 mm or 4 mm) matched to the outer diameter of the mature roe of salmon roe at respective phases of maturing are provided, it is highly recommended that a transferring plate assembly 10 of slits 14 having the width dimension matched to the outer diameter of mature roe of salmon roe is replaced for use.

A conduit member 15 which collects faulty roe and foreign substances dropped from the respective slits 14 and clearance 13 is supported on the frame 5 so as to be provided and inclined downward of the transferring plate assembly 10. A collecting vessel is disposed at the extreme downstream side of the conduit member 15.

Further, a vibrator 16 which is already known is fixed outside the respective side plates 8 as the vibrating means to vibrate the respective side plates 8. The vibrators 16 are not describe in detail because they are already known. However, a brief description is given of the vibrations 16. A weight is eccentrically provided and supported on the rotating axis, wherein since the biased weight turns in line with rotations of the rotating axis, the entirety of the vibrator 16 vibrates. Therefore, the frequency of vibration can be altered by changing the number of revolutions of the rotating axis.

In addition, a salt water supplying pipe 17 extending in the salmon roe transferring direction is supported on the frame 5 upward of the transferring plate assembly 10 at the middle portion of the base 1 in the width direction. Salt water is fed from a salt water reservoir (not illustrated) to the salt water supplying pipe 17 by a pump (not illustrated).

A plurality of shower nozzles 18 which sprinkle salt water onto the respective salmon roe transferring plates 11 at the left and right sides of the salt water supplying pipe 17 are connected to the salt water supplying pipe 17 with clearance remaining in the salmon transferring direction. Also, a manual opening and closing valve 19, which controls opening and closing of the salt water supply, is attached to the salt water supplying pipe 17. Salt water supplied from the respective shower nozzles mainly aims at the washing of salmon roe, and transfer of salmon roe is carried out mainly by vibrations of the vibrators 16 and slow downward inclination of the respective salmon roe transferring plates 11 in the salmon roe transferring direction, wherein salt water auxiliarily contributes to transfer of salmon roe. Salmon roe which is thus transferred from the salmon roe transferring plates 11A to the salmon roe transferring plate 11C via the salmon roe transferring plate 11B are collected from the extreme downstream end of the salmon roe transferring plate 11C into a collection container (not illustrated) via a chute 20 fixed at the salmon roe transferring plate 11C.

A salmon roe supplying casing 21 which supplies salmon roe from the side to the salmon roe transferring plate 11A is fixed at both the side plates 8A and 8B at the upstream side of the extreme upstream side salmon transferring plate 11A, and a supporting arm 22 extending in the direction of inclination almost orthogonal to the direction of inclination of the respective resilient arm 6 is provided and projected on the underside of the salmon roe supplying casing 21.

On the other hand, a bracket 23 having a through hole 24 formed is provided at the abovementioned frame 5 in the vicinity of the tip end portion of the supporting arm 22, and the tip end portion of the supporting arm 22 is inserted into the through hole 24 of the bracket 23. Subsequently, in the bracket 23, a coil spring 25 whose lower end portion is seated on the bracket 23 is wound on the outer periphery of the supporting arm 22, and the salmon roe supplying casing 21 is pressed upward due to actions of the coil spring 25. Therefore, the salmon roe transferring portion 7 vibrated by drive of the respective vibrators 16 is maintained by not only the resilient arms 6 but also the coil spring 25, thereby preventing abnormal vibrations of the salmon roe transferring portion 7.

A hopper 26 fixed at the frame 5 and a chute 27, which supplies salmon roe from the hopper 26 to the salmon roe supplying casing 21, are disposed upward of the salmon roe supplying casing 21. Also, salmon roe is manually or automatically supplied into the hopper 26 consecutively.

Next, a description is given of actions of a preferred embodiment of the invention constructed above.

The respective vibrators 16 attached to the respective sides 8A and 8B of the salmon roe transferring portion 7 are driven to vibrate the respective salmon roe transferring plates 11, and at the same time, salt water is sprinkled from the respective shower nozzles 18 to the respective salmon roe transferring plate 11.

In such a state, as salmon roe (not illustrated) is continuously charged through the hopper 26, salmon roe containing foreign substances is transferred onto the first salmon roe transferring plate 11A of the salmon roe transferring portion via the chute 27 and salmon roe supplying casing 21. And, foreign substances adhered to salmon roe can be separated from normal mature salmon roe by vibrations of the salmon roe transferring plate 11A and salt water, then drop down and are collected on a downward conduit member 15 through either one of slits 14 of the salmon roe transferring plate 11A. In addition, faulty roe which is smaller than the normal, mature roe drops down and are collected by the downward conduit member 15 through either one of the slits 14 of the salmon roe transferring plate 11A.

Thus, although faulty roe and foreign substances are thus removed to some degree, normal, mature roe, the remaining faulty roe and/or foreign substances do not pass through the respective slits 14 of the salmon roe transferring plate 11A, and are transferred from the salmon roe transferring plate 11A onto the next salmon roe transferring plate 11B along with salt water flowing down on the salmon roe transferring plate 11A mainly due to vibrations generated by vibrator 16, and downward inclination of the salmon transferring plate 11A in the salmon roe transferring direction. At this time, part of the faulty roe and foreign substances drop through clearance 13 between the salmon roe transferring plate 11A and salmon roe transferring plate 11B, whereby they are separated from normal, mature roe. In addition, while being transferred on the salmon roe transferring plate 11A, salmon roe scarcely rolls even due to the sprinkled salt water and are transferred at almost the same orientation. However, the salmon roe will change it orientation when it drops from the salmon roe transferring plate 11A to the salmon roe transferring plate 11B.

Foreign substances adhered to salmon roe, which has been transferred onto the salmon roe transferring plate 11B, are separated from the salmon roe, whose orientation was changed, by vibrations of the salmon roe transferring plate 11B and sprinkled salt water, and drop through any slit 14 of the salmon roe transferring plate 11B into the downward conduit member 15 for collection. Also, faulty roe drops through any slit 14 of the salmon roe transferring plate 11B and are collected into the downward conduit member 15.

Thus, the remaining mature roe from which faulty roe and foreign substances are removed, further faulty roe and foreign substances are transferred from the salmon roe transferring plate 11B onto the next salmon roe transferring plate 11C along with salt water streaming down on the salmon roe transferring plate 11B without passing through the respective slits 14 of the salmon roe transferring plate 11A. At this time, part of the remaining faulty roe and foreign substances further drop through the clearance between the salmon roe transferring plate 11B and salmon roe transferring plate 11C and are further separated from the mature roe.

The remaining foreign substances adhered to the salmon roe transferred to the salmon roe transferring plate 11C are separated from the salmon roe by vibrations of the salmon roe transferring plate 11C and sprinkled salt water, and drop through any slit 14 of the salmon roe transferring plate 11C to the downward conduit member 15 for collection. Subsequently, the remaining faulty roe drop into and are collected in the downward conduit member 15 through any slit 14 of the salmon roe transferring plate 11C as well.

Thus, mature roe from which almost all faulty roe and foreign substances are removed are collected from the chute 20 of the downstream end of the salmon roe transferring plate 11C into a collection vessel (not illustrated).

On the basis of a salmon roe selecting and washing machine accoding to the abovementioned embodiment of the invention, since it is possible to efficiently remove faulty roe and foreign substances through slits 14 of salmon roe transferring plates 11 by virtue of vibrations of the transferring plates 11 and supply of salt water, only normal salmon roe, that is, only mature roe can be selected and taken. Therefore, the mature roe are not discolored by oil contained in faulty roe.

In addition, since salmon roe can separated from faulty roe and foreign substances while being washed with salt water, the mature roe taken are sanitary, and since salmon roe can be selected and washed for only 10 seconds or so, the freshness of salmon roe is not impaired.

Further, since salmon roe inputted one after another from the hopper 26 can be continuously selected and washed and collected from the extreme downstream salmon roe transferring plate 11C, the work efficiency is further improved in comparison with a batch system.

Still further, since a vibrator 16 is fixed at the respective side plates 8A and 8B of the salmon roe transferring portion 7, the salmon roe transferring portion 7 can be smoothly vibrated in the left and right directions.

Also, since vibrations of the salmon roe transferring portion 7, which are generated by the vibrators 16, are not transmitted to the surrounding parts by means of shock absorbing members 4, resilient arms 6 and coil springs 25, the outside of the salmon roe selecting and washing machine is not adversely influenced by vibrations and noise.

In addition, the present invention is not limited to the abovementioned embodiment, it may be subjected to various modifications if necessary. The number of salmon roe transferring plates can be adequately determined as necessary.

What is claimed is:

1. A salmon roe selecting and washing machine comprising:
   a plurality of salmon roe transferring plates successively extending in and inclined downwardly in a salmon roe transferring direction,
   a plurality of slits provided in each of said plurality of salmon roe transferring plates, said slits having a width less than a normal salmon roe size,
   a frame,
   a means for resiliently and replaceably supporting said plurality of said salmon roe transferring plates in said frame,
   a means for vibrating said plurality of salmon roe transferring plates;
   a shower means for sprinkling salt water onto said plurality of said salmon roe transferring plates provided above said plurality of said salmon roe transferring plates,
   a base for supporting said frame;
   a plurality of coasters provided on said base for allowing said machine to be easily moved, and
   a plurality of engageable stoppers extending downwardly from said base, said plurality of stoppers for selectively engaging with a surface on which said coasters rest to prevent movement of said machine, and wherein
   a clearance through which normal salmon roe will not fall is formed between adjacent pairs of said plurality of said salmon roe transferring plates.

2. A salmon roe selecting and washing machine as set forth in claim 1, wherein a salmon roe supplying casing spring-pressed upward is disposed at an upstream end of said plurality of said salmon roe transferring plates, and a chute for supplying salmon roe is provided upward of said salmon roe supplying casing.

3. A salmon roe selecting and washing machine as set forth in claim 1, wherein said vibrating means is provided at both sides of said plurality of said salmon roe transferring plates.

4. A salmon roe selecting and washing machine as set forth in claim 2, wherein said vibrating means is provided at both sides of said plurality of said salmon roe transferring plates.

* * * * *